United States Patent [19]

Lyon

[11] Patent Number: 5,946,410
[45] Date of Patent: Aug. 31, 1999

[54] ADAPTIVE CLASSIFIER FOR COMPOUND CHARACTERS AND OTHER COMPOUND PATTERNS

[75] Inventor: Richard F. Lyon, Los Altos, Calif.

[73] Assignee: Apple Computer, Inc., Cupertino, Calif.

[21] Appl. No.: 08/586,233

[22] Filed: Jan. 16, 1996

[51] Int. Cl.$^6$ .................................................. G06K 9/66
[52] U.S. Cl. ......................... 382/157; 382/158; 382/224
[58] Field of Search .................... 382/156, 157, 382/159, 161, 224, 306, 227, 228, 229, 185, 158; 706/15

[56] References Cited

U.S. PATENT DOCUMENTS

| | | | |
|---|---|---|---|
| 3,710,321 | 1/1973 | Rubenstein | 382/226 |
| 4,611,346 | 9/1986 | Bednar et al. | 382/174 |
| 4,754,489 | 6/1988 | Bokser | 382/230 |
| 5,373,566 | 12/1994 | Murdock | 382/156 |
| 5,425,108 | 6/1995 | Hwang et al. | 382/159 |

OTHER PUBLICATIONS

Ohtomo et al. "Two–Stage Recognition Method of Hand-–Written Chinese Characters Using an Integrated Neural Network Model." Denshi Joohoo Tsuushin Gakkai Ronbunshi, D–II, vol. J74–D–II, No. 2, pp. 158–165 (with English translation), Feb. 1991.

Kuo et al. "A Radical–Partitioned coded Block Adaptive Neural Network Structure for Large–Volume Chinese Characters Recognition." Neural Networks 1992, IJCNN, Jun. 1992.

Kuo et al. "A Radical–Partitioned Neural Network System Using a Modified Sigmoid Function and a Weight–Dotted Radical Selector for Large–Volume Chinese Character Recognition VLSI." IEEE Int. Symp. Circuits and Systems, Jun. 1994.

*Primary Examiner*—Jon Chang
*Attorney, Agent, or Firm*—Burns, Doane, Swecker & Mathis, L.L.P.

[57] ABSTRACT

A statistical classifier utilizes combined output values to determine posterior probabilities for certain output classes. In the field of handwriting recognition, compound characters are factored into classes of base letter forms and diacritical marks. A separate output activation value is produced for each base letter form and each diacritical mark. Pairs of output values, comprised of one value for a base letter form and one value for a diacritical mark, are combined to produce a posterior probability for every possible compound character, without requiring a network output for each possible class.

21 Claims, 2 Drawing Sheets

ADAPTIVE CLASSIFIER FOR COMPOUND CHARACTERS AND OTHER COMPOUND PATTERNS

FIELD OF THE INVENTION

The present invention is directed to adaptive classifiers that are used for pattern recognition, such as handwriting recognition, and more particularly to an adaptive classifier which is capable of recognizing compound characters and other similar types of compound patterns.

BACKGROUND OF THE INVENTION

In the field of pattern recognition, it is generally desirable to employ an adaptive type of statistical classifier, rather than a programmed classifier, in those situations where input samples which belong to the same class of patterns can have an unknown variance between them. One example of such a situation is the field of handwriting recognition. While alphanumeric characters have well defined shapes, the manner in which individuals write those characters can vary widely among different persons. Even the same person can write characters differently at various times. A classifier that is programmed to recognize particular patterns, such as the letters of an alphabet, may not be able to accommodate the nuances introduced by the handwriting of different individuals. Conversely, a classifier which has trainable properties, for example one which employs a neural network, can be taught to recognize that different variations of the same character belong in the same class. For this reason, adaptive statistical classifiers are used for applications such as speech recognition, handwriting recognition and optical character recognition.

In general, an adaptive statistical classifier, such as a neural network, produces a number of output values which respectively correspond to each of the possible output classes for which the classifier has been trained. For example, in the field of character recognition and handwriting recognition, each character of an alphabet might comprise an output class. Thus, for a classifier which is trained on the English alphabet, there might be 52 output nodes, which respectively correspond to each of the upper and lower case letters of the alphabet. For a given input sample, the network produces 52 output values, which respectively indicate the probability that the input sample belongs to each of the 52 classes. These probabilities are then processed in other modules of a recognition system, for example with reference to a dictionary, to provide an estimate of the class to which the input pattern belongs.

In the training of a classifier, a number of training samples are individually provided as input data to the classifier, and a target output vector is designated for each input sample. Thus, if a training sample comprises a pattern which is labelled as the letter "a", the output class corresponding to this letter is given a target value of "1", and all other output classes are given a target value of "0". For each training sample that is provided to the classifier, an output vector is produced. This output vector is compared with the target output, and the differences between the two represent an error. This error is then employed to train the classifier. For example, in a neural network, the value of the error can be back-propagated through each of the layers of the network, and used to adjust weights assigned to paths through which the data propagates in the operation of the classifier. By repeating this process a number of times, the weights are adjusted in a manner which causes the output vector of the classifier to converge toward a target value for a given input sample.

As the number of output classes increases, the number of possible output nodes also increases, with the result that a larger number of input samples are required to properly train the classifier. For example, the alphabets for some European languages contain more than the 26 characters of the English alphabet. Many of these additional characters comprise a combination of a base Roman letter and a diacritical mark, such as acute, grave, dieresis, tilde, circumflex, ring, hacek, breve, and the like. In a conventional classifier, a separate output class is provided for each of these additional characters. If a single classifier is designed to be multilingual, and thereby recognize characters in each of a number of languages, such as the various European languages for example, a significant number of additional output classes is required, resulting in a concomitant increase in the number of samples, and hence time, needed to train the classifier.

Not all of the compound characters are utilized in all of the languages. In an effort to reduce the number of output classes, therefore, it is possible to design classifiers for a specific language. However, such a classifier has severely limited applicability, since it cannot recognize characters that are employed in languages other than the one for which it was designed.

It is desirable, therefore, to provide a statistical classifier that is capable of recognizing characters that are employed in a variety of different languages, while minimizing the amount of effort that is required to train such a classifier.

BRIEF STATEMENT OF THE INVENTION

In accordance with the present invention, a neural network utilizes combined output values to determine probabilities for certain output classes, rather than having one output value for each class. For example, compound characters can be factored into classes of base letters and diacritical marks. A separate output value can be produced for each base character and each diacritical mark. By combining the output values for each base character with those for each diacritical mark, the probability can be obtained for every possible compound character. With such an approach, the total number of output nodes for the neural network can be reduced, to thereby decrease the training burden.

In comparison with a network that has one output signal per class, the present invention results in a smaller size for the classifier network. Furthermore, since common information is shared about base characters and diacritical marks between the training samples, fewer total samples are needed to obtain adequate training. All of the factoring relating to compound characters takes place within the classifier portion of the recognition system. As a result, other portions of the recognition system, such as search and dictionary modules, do not require any special features to handle these additional characters.

The foregoing features of the invention, as well as the advantages obtained thereby, are explained in greater detail hereinafter with reference to specific embodiments illustrated in the accompanying drawings.

DETAILED DESCRIPTION

The present invention is generally directed to adaptive statistical classifiers that are employed to recognize input information from a variety of sources. Typical applications of such classifiers are in the fields of handwriting recognition and optical character recognition. In general, neural networks, which are inherently trainable devices, have been employed in these types of applications. Accordingly, the principles of the present invention are described hereinafter with reference to their implementation in a neural network. Furthermore, to facilitate an understanding of the invention, an exemplary neural network is described in the context of its application to a word recognition system that is applicable to both on-line handwriting and printed optical character recognition. It will be appreciated, however, that the practical applications of the principles which underlie the present invention are not limited to this particular example. Rather, they are generally applicable to statistical classifiers which may be used in any environment where the input samples may comprise combinations of features that are shared among multiple input samples.

Figure 1:
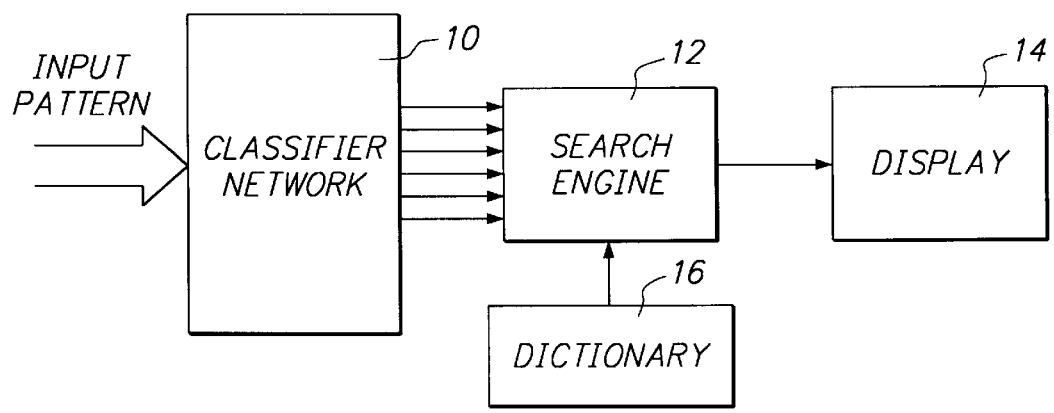
FIG. 1 is a general block diagram of a recognition system that is used for handwriting recognition and optical character recognition.

A system that is used for character recognition, particularly handwriting recognition, is illustrated in block diagram form in FIG. 1. Referring thereto, an input pattern to be classified is provided to a classifier network 10. The input pattern might be one that is written on a screen by a user with an electronic pen, or provided via a scanner, for example. The classifier network 10 produces a number of output values, each of which represents a posterior probability that the input pattern belongs to a particular class associated with a letter of the alphabet of interest. These probabilities are provided to a search engine 12, which combines probabilities of different with other information to render an overall recognition decision. The estimated letters can be displayed on a display 14.

The search engine 12 operates in conjunction with one or more dictionaries 16, which contain a list of recognized words. When the first input pattern, corresponding to the first letter entered by the user, is processed, the search engine will likely produce an estimate that the letter corresponds to the class having the highest probability. As successive patterns are processed, different combinations of probabilities are considered by the search engine, with reference to the dictionary 16, to produce an estimate of the word or words represented by the input patterns. In addition to the dictionary, the search engine can base its decision on geometric constraints and/or textual context, provided via other modules (not shown).

Figure 2:
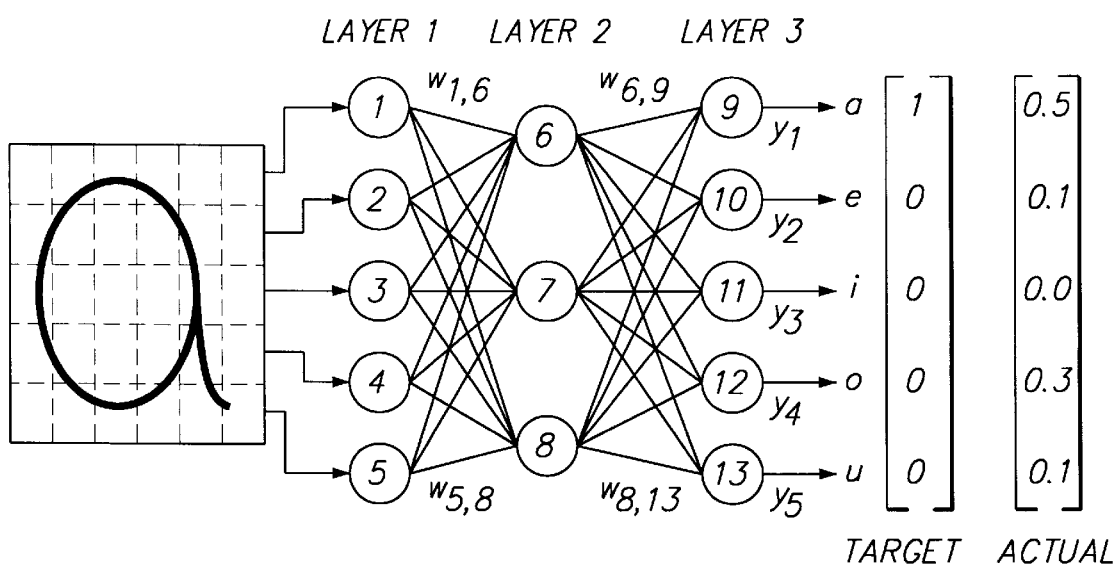
FIG. 2 is a schematic diagram of a neural network that can be used for classification in a handwriting recognition system.

The general structure and operation of a recognition system such as that depicted in FIG. 1 is well known, and therefore will not be discussed in greater detail herein. The present invention is particularly directed to the classifier network 10. Preferably, such a network is implemented in a neural network. While the structure of a neural network does not form part of the present invention itself, an exemplary neural network is described hereinafter to facilitate an understanding of the principles which underlie the invention. Referring to FIG. 2, a neural network which might be used for handwriting recognition is illustrated. This particular network is a three-layered back-propagation network, in which the nodes of each layer are fully interconnected. In the illustrated embodiment, an input layer, Layer 1, comprises five nodes 1–5 which respectively receive input values relating to a handwritten character. For example, the input values may relate to an image of the character on an input grid, as illustrated in FIG. 1. Alternatively, the input values could relate to features of the handwritten character, such as stroke features as drawn by the user. In a preferred implementation of the invention, multiple representations of the character, such as a combination of its image and stroke features, are employed as input parameters. For further information in this regard, reference is made to co-pending, commonly assigned application Ser. No. 08/512,060, filed Aug. 8, 1995.

The values received at the respective input nodes of Layer 1 are provided to each of the three nodes 6–8 in Layer 2, which is known as a "hidden layer." Each connection between a node of Layer 1 and a node of Layer 2 is defined by a corresponding weight, $w_{ij}$, where i refers to a node in the first layer and j represents a node in the second layer. In FIG. 1, the link between the first node of Layer 1 and the first node of Layer 2 has an associated weight $w_{16}$, and the link between the fifth node of Layer 1 and the third node of Layer 2 has a weight $w_{58}$. Each of the other links between the nodes of the two layers also has an associated weight, which is not identified in FIG. 1 for clarity. The input value which is provided to a node in Layer 2 is equal to the value at a node of Layer 1 multiplied by the weight of the corresponding link. In addition to these inputs from other nodes, a constant "bias weight" input is also provided to each node. Within each node, all of the input values are summed, and the result is processed via a sigmoid or other non-linearity function, to produce an output value, or activation value.

In a similar manner, the activation values from the respective nodes of Layer 2 are multiplied by corresponding weights, $W_{jk}$, and provided to the nodes of an output layer, Layer 3. In each of the nodes 9–13 of Layer 3, all of the input values, including a bias weight, are summed and processed, to produce an output value $y_k$. Each of the nodes in the output layer corresponds to one of the classes into which input samples are classified. In the example of FIG. 1, there are five classes, which respectively correspond to the vowels a, e, i, o and u. The output value $y_k$ that is produced at each of the nodes of Layer 3 represents the probability that a given input sample belongs to the associated class.

It will be appreciated, of course, that the embodiment of the neural network shown in FIG. 2 is a simple example, for illustration purposes. In practice, the number of nodes in each layer is likely to be much greater, to accommodate an appropriate number of input parameters and output classes. For example, a neural network that is trained to recognize each of the characters in the English alphabet might have 52 output classes, one for each of the uppercase and lowercase versions of the 26 letters which comprise the alphabet.

In the training of a neural network, an input sample is provided, and a target value is set for each of the output nodes. For neural networks which are used as classifiers, target values are determined from labels that indicate which class each training sample is considered to belong to. In practice, the vast majority of labels are likely to be correct, although some errors may be tolerated or even inevitable, depending upon the particular problem domain. In the example of FIG. 2, the input sample is labelled as the letter "a", and the target values $y_i$ are equal to "1" for the class corresponding to the character "a", and "0" for each of the other classes. When this input sample is applied to the network, the actual output values form a vector, an example of which is shown in the right column of FIG. 2. In this example, the network estimates that the probability that the input sample belongs to class "a" is 0.5, class "o" is 0.3, etc.

The differences between the target values and the actual output values represent errors, which are back-propagated through the network to adjust the weight values of each of the links, and thereby train the network to better recognize the input sample.

It can be seen that as the number of output classes is expanded, the possible output vectors increase exponentially. Consequently, the burden required to adequately train the classifier, and more precisely the number of input samples that must be provided during the training process, also increases dramatically. In addition, the size of the overall network, and hence its complexity, also increases. For example, as discussed previously, a classifier which is designed for the English alphabet might have 52 output nodes to accommodate 26 different characters (assuming that numbers and punctuation marks are not to be considered). A number of European languages include characters in addition to the standard 26 letters which make up the English alphabet. Many of these additional characters can be labelled as "compound" characters, in the sense that they comprise a combination of a base letter form and a diacritical mark. Different languages employ different ones of these compound characters. If a single classifier is designed to recognize all of the characters in each of the various European languages, it can be appreciated that a much greater number of output classes may be required than for the case of a single-language classifier. Consequently, a significantly greater effort may be required to train the classifier. In accordance with the present invention, however, the number output classes, and hence the required training effort, can be minimized by factoring the classification of compound characters into separate output activation values for the base letter forms and the diacritical marks.

Figure 3:
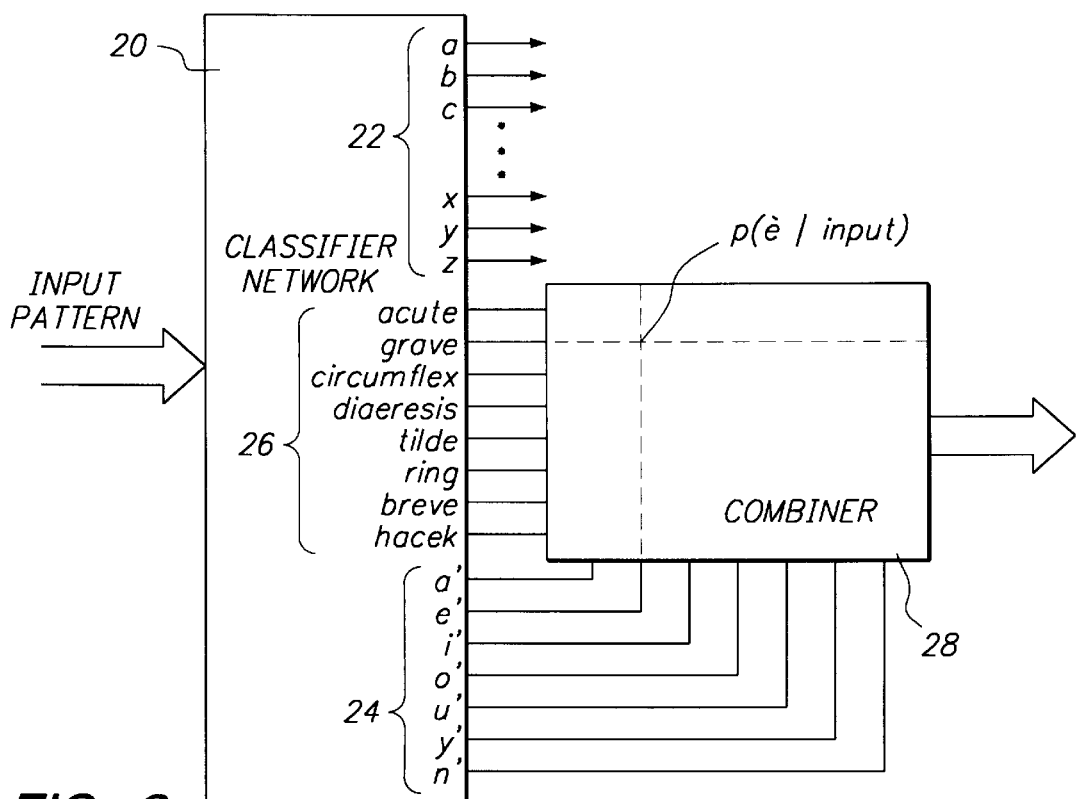
FIG. 3 is a block diagram of a classifier network in accordance with the present invention.

An embodiment of a classifier in accordance with the present invention is illustrated in block diagram form in FIG. 3. Referring thereto, the classifier includes an adaptive network 20, for example a neural network of the type illustrated in FIG. 2. The network has a first set of output nodes 22, corresponding to classes for each of the base letters of an alphabet, e.g. the 26 letters of the Roman alphabet. In addition to these base letters, an alphabet of interest may include one or more compound characters, which are comprised of a base letter form combined with a diacritical mark. These two components of the compound characters are factored into different sets of output nodes. One set of output nodes 24 corresponds to each of the base letter forms which can be employed in a compound character. In the character recognition process, a base letter which appears with a diacritical mark must be distinguished from the corresponding singular letter by itself. In the example of FIG. 3, the output nodes for the base letters which form components of compound characters are identified with a prime symbol. Another set of output nodes 26 for the network relates to the various diacritical marks, e.g., acute, grave, circumflex, etc. The output activation values for each of the two sets of output nodes that pertain to compound characters are provided as input signals to a combiner 28. The combiner provides an output value for each combination of a base letter form from the set 24 and a diacritical mark from the set 26. The output value from the combiner indicates the probability that an input pattern belongs to a class corresponding to the combined base letter form and diacritical mark.

Figure 4:
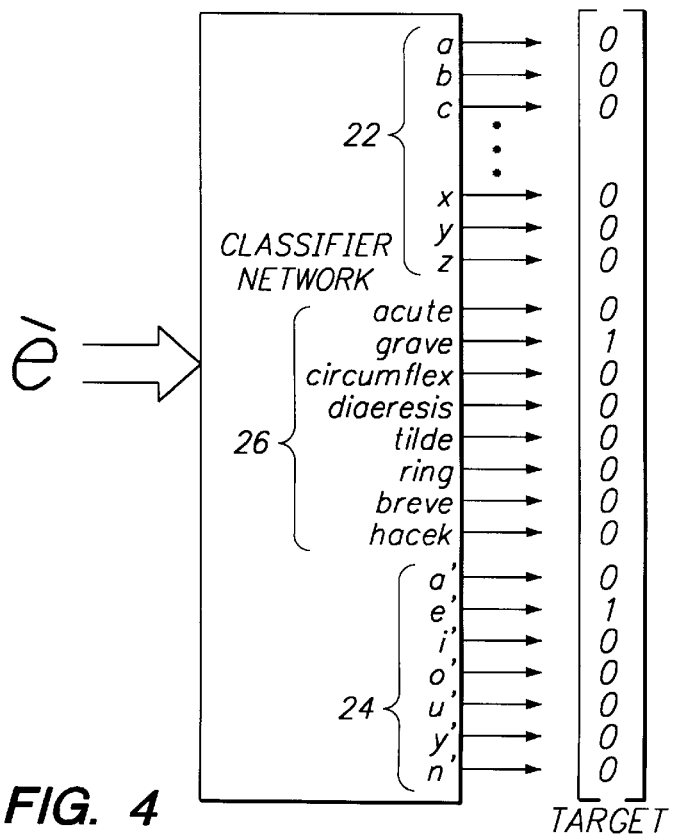
FIG. 4 is a block diagram of the classifier network of FIG. 3, illustrating a training example.

The training of such a network differs from the conventional case, in that two different output nodes of the network are given positive target values, e.g., 1, if an input sample is labelled as belonging to one of the classes of compound characters. For example, with reference to FIG. 4, if the input sample is labelled as belonging to the class for the character "è" the output nodes for the base letter form e' and for the "grave" symbol are both given target values of 1. In other words, the output vector from the classifier 20 should indicate that the input pattern belongs to both of these output classes.

During the recognition phase of operation of the classifier, pairs of output activations, one from each of the sets 24 and 26 of nodes, are combined. In one embodiment, the two activation values can be multiplied. The product of this multiplication is the posterior probability that a given input sample belongs to a particular compound character class. For example, the probability that an input sample belongs to the class è is obtained by multiplying the activation value for the class e' by the activation value for the class associated with the diacritical mark "grave". If there are M output nodes in the set 24 of base letter forms, and N output nodes in the set 26 of diacritical marks, the combiner 28 provides an output for each of the possible M×N compound characters that can be formed from these two sets of symbols. These probabilities can then be provided to the search engine of the handwriting recognition system, along with the probabilities for each of the singular letters from the set of output nodes 22, to determine the final estimate.

Thus, the classification network in accordance with the present invention differs from a conventional classifier network, in that the output activations of the network do not have a one-to-one correspondence with the output classes of interest. Rather, compound characters are factored into separate activation sets that can be combined to form the classes of interest. One of the advantages of this approach is that the size of the classifier network is smaller than one which provides an output activation per class. Furthermore, the effort required to train the system is significantly reduced, for at least two reasons. First, since the network itself is smaller, it is likely to be less complex, and hence fewer training samples are required to cause its output activation values to converge toward the desired results. Secondly, common information about the base letter forms and the diacritical marks is shared between training samples in different final classes. As a result, fewer total samples are needed to provide adequate training. The factoring aspect of the invention takes place entirely within the classifier network 20 that produces the posterior probability estimates for each class. As a result, other components of the handwriting recognition system, such as the search engine and dictionary related modules, are not impacted, and do not need to be modified to handle these characters in any special manner.

In the disclosed embodiment, the combiner 28 is implemented as a multiplier which multiplies each one of the N activation values for the diacritical marks by each one of the M activation values for the base letter forms, to produce an M×N matrix of posterior probabilities. If desired, other approaches can be employed to combine the two activation values to produce a probability. For example, a bias factor might be employed to increase or decrease the probabilities for compound characters. Rather than multiplying the values, they might be averaged. As another alternative, each value might be first raised to a given power, and the resulting powerrs multiplied together.

It will be appreciated by those of ordinary skill in the art that the present invention can be embodied in other specific forms without departing from the spirit or essential characteristics thereof. For example, while the disclosed embodiment of the invention has been described in the context of handwriting recognition, the principles of the invention are not limited thereto. Rather, the invention has general applicability to any type of pattern recognition application in which some of the expected input patterns are comprised of components which are shared among a number of input patterns, and capable of being factored into different sets.

The presently disclosed embodiment is therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. An adaptive classifier for recognizing patterns, at least some of which include components that are shared among a plurality of patterns, comprising:
   a classifier network for receiving an input pattern and generating output activation values which comprise estimates that the input pattern belongs to respective classes, said network including:
      a first set of output nodes which respectively produce output activation values that provide an estimate whether the input pattern contains elements in a first set of shared pattern components, and
      a second set of output nodes which respectively produce output activation values that provide an estimate whether the input pattern contains elements in a second set of pattern components; and
   a combiner for combining pairs of output activation values, in which each pair comprises an output activation value at one of the nodes of said first set of output nodes and an output activation value at one of the nodes of said second set of output nodes, to generate estimates that the input pattern belongs to respective classes of compound patterns.

2. The adaptive classifier of claim 1, wherein said combiner multiplies the output activation values in a pair to generate an estimate.

3. The adaptive classifier of claim 1, wherein said classifier network is a neural network.

4. The adaptive classifier of claim 1, wherein said classifier network further includes a third set of output nodes which respectively correspond to patterns that do not contain shared pattern components.

5. The adaptive classifier of claim 1 wherein said combiner combines the output activation value from each of the output nodes in said first set with the output activation values from each of the output nodes in said second set to produce a plurality of estimates respectively relating to different patterns containing shared pattern components.

6. An adaptive classifier for recognizing patterns corresponding to letters of an alphabet, in which at least some of said letters are compound characters comprised of a base letter form and a diacritical mark, comprising:
   a classifier network for receiving an input pattern and generating output activation values which comprise estimates that the input pattern belongs to respective classes, said network including:
      a first set of output nodes which respectively produce output activation values that provide an estimate whether the input pattern contains a corresponding one of said base letter forms, and
      a second set of output nodes which respectively produce output activation values that provide an estimate whether the input pattern contains a corresponding one of said diacritical marks; and
   a combiner for combining an output activation value from one of the nodes from said first set with an output activation value from one of the nodes from said second set to produce an estimate that the input pattern belongs to a class corresponding to one of said compound characters.

7. The adaptive classifier of claim 3, wherein said classifier network further includes a third set of output nodes which respectively correspond to letters of said alphabet that are not compound characters.

8. The adaptive classifier of claim 3 wherein said combiner multiplies the output activation values from said two nodes to produce said estimate.

9. The adaptive classifier of claim 3 wherein said combiner combines the output activation value from each of the nodes in said first set with the output activation values from each of the nodes in said second set to produce a plurality of estimates respectively relating to different compound characters.

10. The adaptive classifier of claim 6, wherein said classifier network is a neural network.

11. A method for recognizing patterns corresponding to letters of an alphabet, in which at least some of said letters are compound characters comprised of a base letter form and a diacritical mark, comprising the steps of:
   defining a first set of classes, in which each class relates to a set of compound characters having a given diacritical mark;
   defining a second set of classes, in which each class relates to a set of compound characters having a given base letter form;
   defining a third set of classes, in which each class relates to a letter of an alphabet that is not a compound character;
   analyzing an input pattern and providing output values which respectively indicate the probability that the input pattern belongs to the classes in said first, second and third sets of classes; and
   combining an output value associated with a class from said first set of classes and an output value associated with a class from said second set of classes to produce a probability that the input pattern corresponds to one of said compound characters.

12. The method of claim 11 wherein said combining step comprises the step of multiplying said output values to produce said probability.

13. The method of claim 11 wherein said combining step comprises the steps of multiplying each of the output values associated with the respective classes in said first set with each of the output values associated with respective classes in said second set to produce a plurality of probabilities that are respectively associated with different compound characters.

14. A method for training an adaptive classifier of a type having a first set of output nodes which respectively relate to elements in a first set of shared pattern components, a second set of output nodes which respectively relate to elements in a second set of pattern components, and a combiner for combining an output activation value at one of the nodes of said first set of output nodes and an output activation value at one of the nodes of said second set of output nodes, said method comprising the steps of:
   identifying training samples which define compound patterns made up of components from said first and second sets;
   providing one of said training samples which defines a compound pattern as an input sample to said classifier to produce output activation values;

establishing target activation values for said input sample, in which the target activation values for at least two of said nodes are positive to indicate that the input sample has features which belong to each of two different output categories;

measuring differences between actual output activation values produced at said nodes in response to said input sample and said target activation values; and adjusting the operation of said neural network in accordance with said differences.

15. The method of claim 14 wherein said positive target activation values relate to two nodes that are respectively associated with said first and second sets of output nodes.

16. An adaptive classifier for recognizing patterns, at least some of which include components that are shared among a plurality of patterns, comprising:

a classifier network for receiving an input pattern and generating output activation values which comprise estimates that the input pattern belongs to respective classes, said network including:

a first set of output nodes which are trained with a set of training patterns and a first set of target output values to produce output activation values which provide an estimate whether an unknown input pattern contains associated elements in a first set of shared pattern components, and a second set of output nodes which are trained with said set of training patterns and a second set of target output values to produce output activation values which provide an estimate whether an unknown input pattern contains associated elements in a second set of pattern components; and a combiner for combining pairs of output activation values, in which each pair comprises an output activation value at one of the nodes of said first set of output nodes and an output activation value at one of the nodes of said second set of output nodes, to generate estimates that an unknown input pattern belongs to respective classes of compound patterns.

17. The adaptive classifier of claim 16, wherein said classifier network further includes a third set of output nodes which respectively correspond to patterns that do not contain shared pattern components.

18. The adaptive classifier of claim 16 wherein said combiner combines the output activation value from each of the output nodes in said first set with the output activation values from each of the output nodes in said second set to produce a plurality of estimates respectively relating to different patterns containing shared pattern components.

19. An adaptive classifier for recognizing patterns corresponding to letters of an alphabet, in which at least some of said letters are compound characters comprised of a base letter form and a diacritical mark, comprising:

a classifier network for receiving an input pattern and generating output activation values which comprise estimates that the input pattern belongs to respective classes, said network including:

a first set of output nodes which are trained with a set of training patterns and a first set of target output values to produce output activation values which provide an estimate whether an unknown input pattern contains a corresponding one of said base letter forms, and a second set of output nodes which are trained with said set of training patterns and a second set of target output values to produce output activation values which provide an estimate whether an unknown input pattern contains a corresponding one of said diacritical marks; and a combiner for combining an output activation value from one of the nodes from said first set with an output activation value from one of the nodes from said second set to produce an estimate that an input pattern belongs to a class corresponding to one of said compound characters.

20. The adaptive classifier of claim 19, wherein said classifier network further includes a third set of output nodes which respectively correspond to letters of said alphabet that are not compound characters.

21. The adaptive classifier of claim 19 wherein said combiner combines the output activation value from each of the nodes in said first set with the output activation values from each of the nodes in said second set to produce a plurality of estimates respectively relating to different compound characters.

* * * * *

UNITED STATES PATENT AND TRADEMARK OFFICE
CERTIFICATE OF CORRECTION

PATENT NO. : 5,946,410

DATED : August 31, 1999

INVENTOR(S) : Richard F. LYON

It is certified that an error appears in the above-identified patent and that said Letters Patent is hereby corrected as shown below:

```
Column 8, Line 5, delete "3", insert --6--;
Column 8, Line 9, delete "3", insert --6--; and
Column 8, Line 12, delete "3", insert --6--.
```

Signed and Sealed this

Tenth Day of April, 2001

Attest:

NICHOLAS P. GODICI

Attesting Officer     Acting Director of the United States Patent and Trademark Office